(12) United States Patent
Park et al.

(10) Patent No.: US 11,171,536 B2
(45) Date of Patent: Nov. 9, 2021

(54) COVER ASSEMBLY AND MOTOR INCLUDING SAME

(71) Applicant: LG INNOTEK CO., LTD., Seoul (KR)

(72) Inventors: Kyung Sang Park, Seoul (KR); Ju Hwan Ku, Seoul (KR); Jin Ho Kim, Seoul (KR); Tae Yoon Kim, Seoul (KR); Byeong Jong Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 246 days.

(21) Appl. No.: 16/343,971

(22) PCT Filed: Nov. 1, 2017

(86) PCT No.: PCT/KR2017/012245
§ 371 (c)(1),
(2) Date: Apr. 22, 2019

(87) PCT Pub. No.: WO2018/085456
PCT Pub. Date: May 11, 2018

(65) Prior Publication Data
US 2020/0052545 A1    Feb. 13, 2020

(30) Foreign Application Priority Data

Nov. 7, 2016 (KR) .......................... 10-2016-0147625
Mar. 9, 2017 (KR) .......................... 10-2017-0030102

(51) Int. Cl.
| H02K 5/00 | (2006.01) |
| H02K 5/22 | (2006.01) |
| H02K 5/173 | (2006.01) |

(52) U.S. Cl.
CPC ............ *H02K 5/225* (2013.01); *H02K 5/1735* (2013.01)

(58) Field of Classification Search
CPC ...... H02K 5/173; H02K 5/225; H02K 5/1735; H02K 3/34; H02K 7/08; H02K 5/02; H02K 5/22; H02K 3/522; H02K 2203/09
See application file for complete search history.

(56) References Cited

U.S. PATENT DOCUMENTS 5,508,571 A * 4/1996 Shafer, Jr. ................ H02K 3/28
                                                         310/179
6,628,023 B1 * 9/2003 Paquet ...................... H02K 3/38
                                                         310/71

(Continued)

FOREIGN PATENT DOCUMENTS

| CN | 1455502 A | 11/2003 |
| CN | 1808851 A | 7/2006 |

(Continued)

*Primary Examiner* — Quyen P Leung
*Assistant Examiner* — Leda T Pham
(74) *Attorney, Agent, or Firm* — Birch, Stewart, Kolasch & Birch, LLP

(57) ABSTRACT

One embodiment relates to a cover assembly and a motor including the same, the cover assembly comprising: a cover body; and a plurality of grooves formed on the upper surface of the cover body so as to guide coils, wherein a hole is formed at one side of the groove so as to penetrate the cover body. Therefore, the motor guides the coils to the outside by using the hole formed in the cover assembly such that assemblability is improved.

20 Claims, 16 Drawing Sheets

(56) References Cited

U.S. PATENT DOCUMENTS

| | | | | |
|---|---|---|---|---|
| 6,664,677 | B2 * | 12/2003 | Tanaka | H02K 11/046 |
| | | | | 310/68 D |
| 6,936,940 | B2 * | 8/2005 | Kobayashi | H02K 1/187 |
| | | | | 310/67 R |
| 2004/0000828 | A1 | 1/2004 | Kobayashi et al. | |
| 2010/0187924 | A1 * | 7/2010 | Yagai | H02K 3/522 |
| | | | | 310/71 |
| 2011/0309724 | A1 * | 12/2011 | Min | H02K 1/187 |
| | | | | 310/425 |
| 2016/0294240 | A1 * | 10/2016 | Kawamoto | H02K 3/522 |

FOREIGN PATENT DOCUMENTS

| | | |
|---|---|---|
| CN | 106026476 A | 10/2016 |
| DE | 10 2016 204 647 A1 | 10/2016 |
| EP | 1 677 404 A2 | 7/2006 |
| JP | 2006-187175 A | 7/2006 |
| JP | 2008-118792 A | 5/2008 |
| JP | 2008-278704 A | 11/2008 |
| KR | 20-0432036 Y1 | 11/2006 |
| KR | 10-2016-0085105 A | 7/2016 |

\* cited by examiner

[FIG. 1]
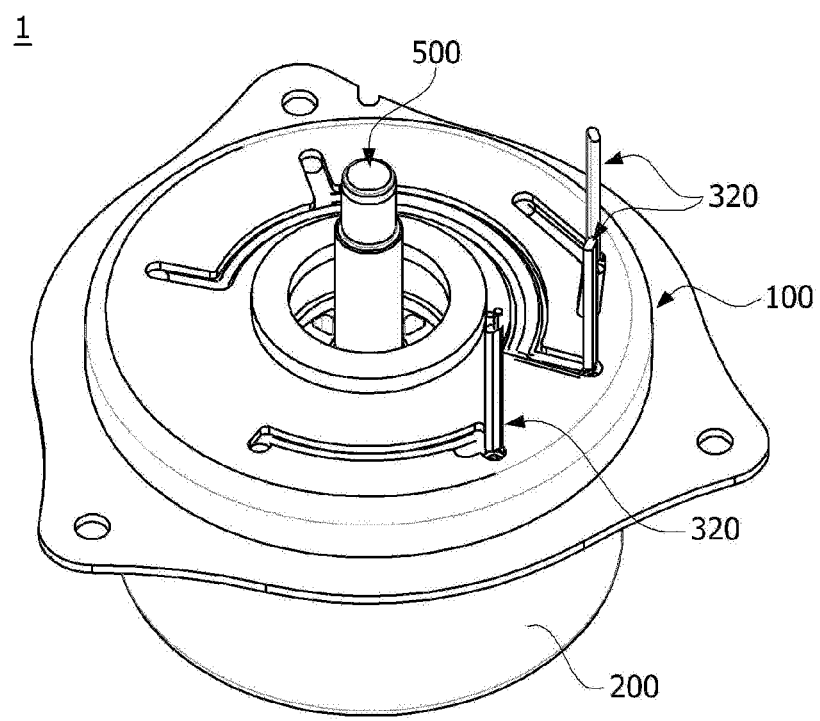

[FIG. 2]
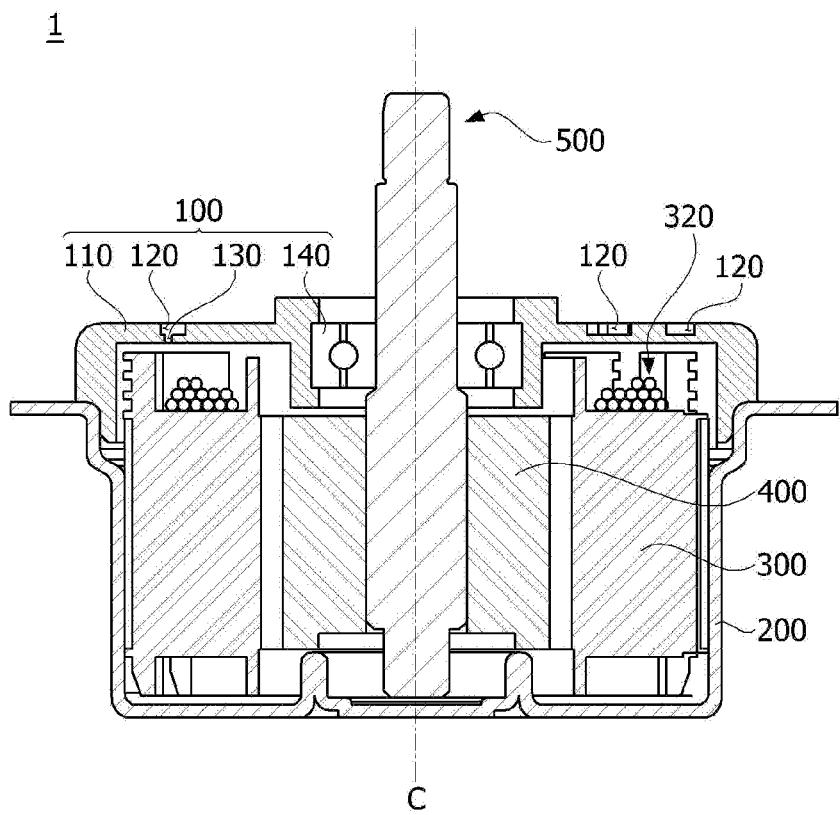

[FIG. 3]
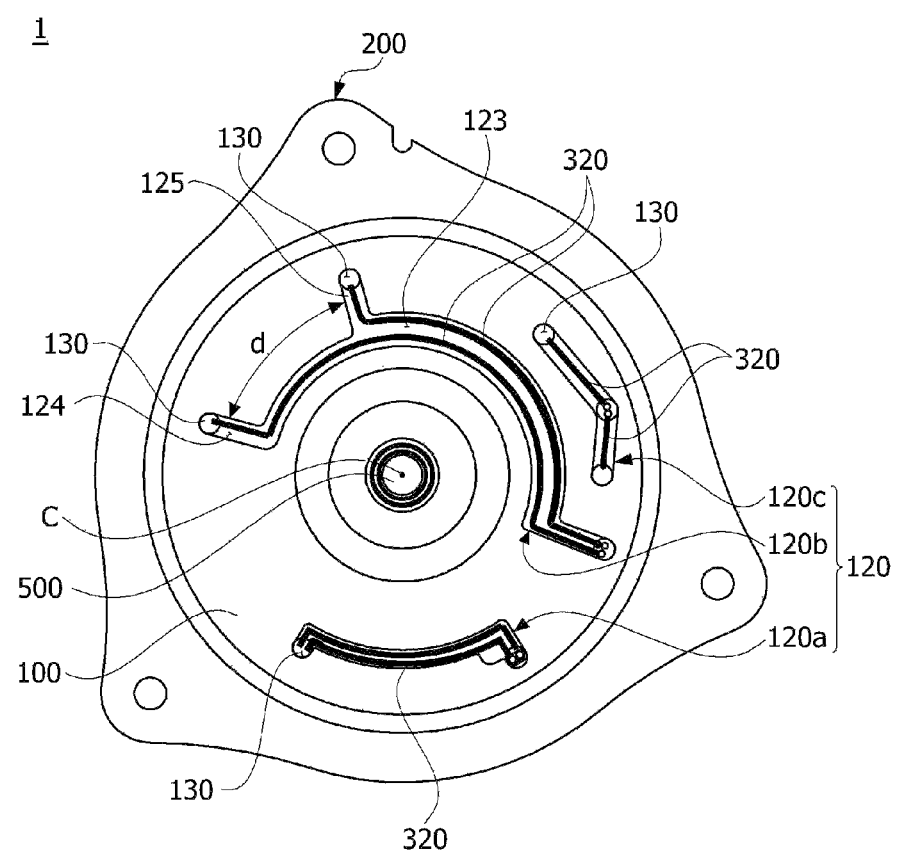

[FIG. 4]
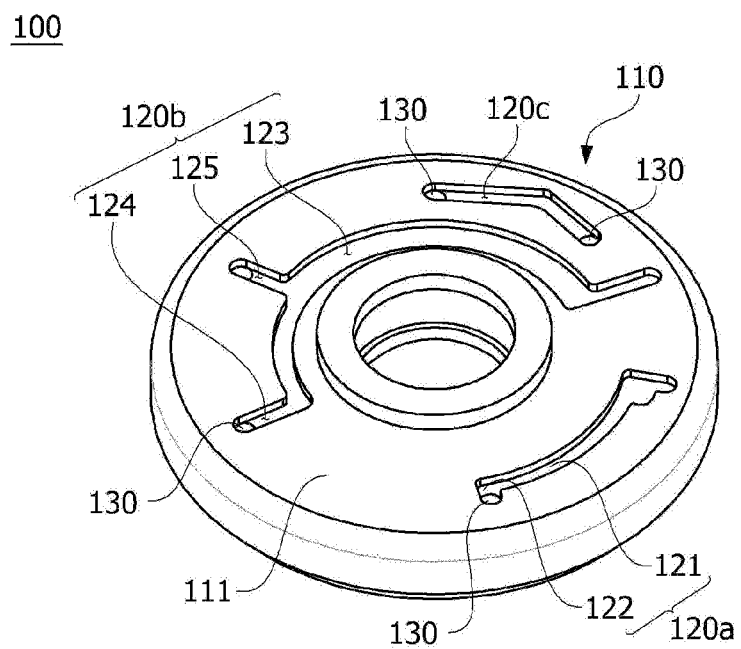

[FIG. 5]
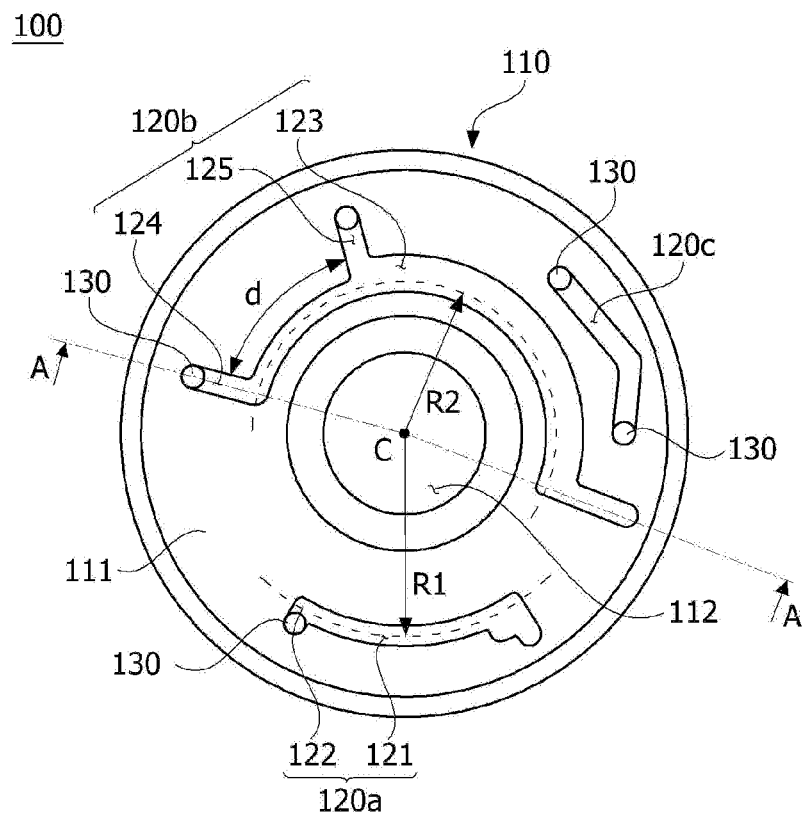
[FIG. 6]
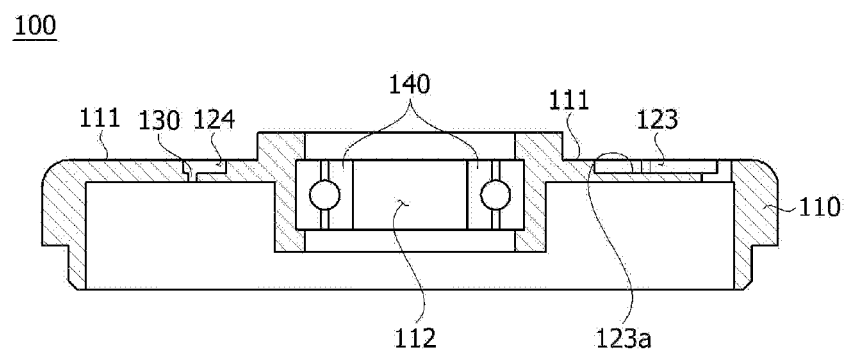

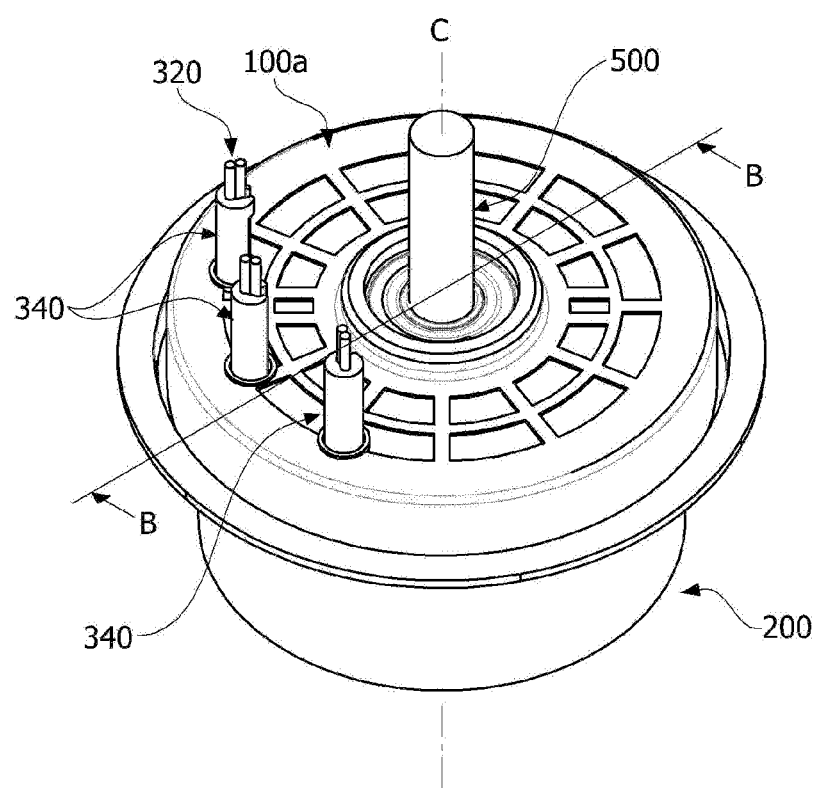
[FIG. 7]

[FIG. 8]
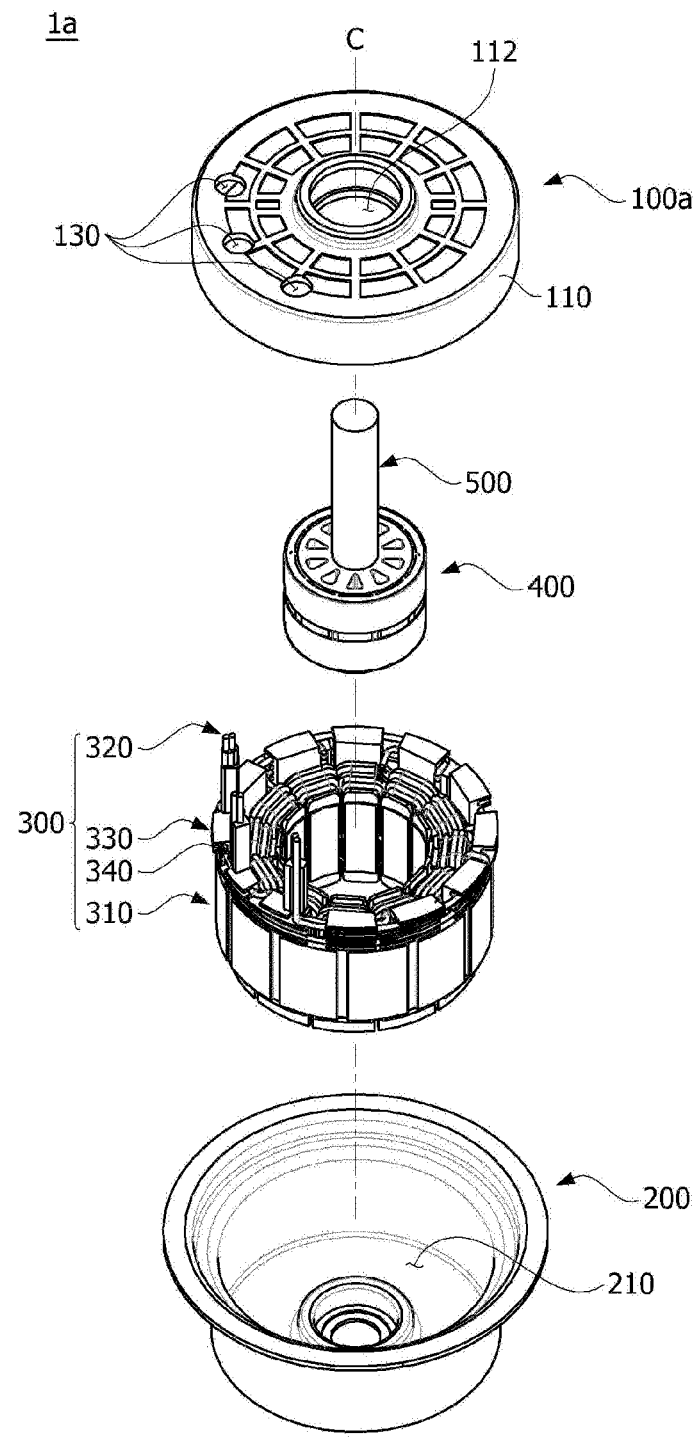

[FIG. 9]
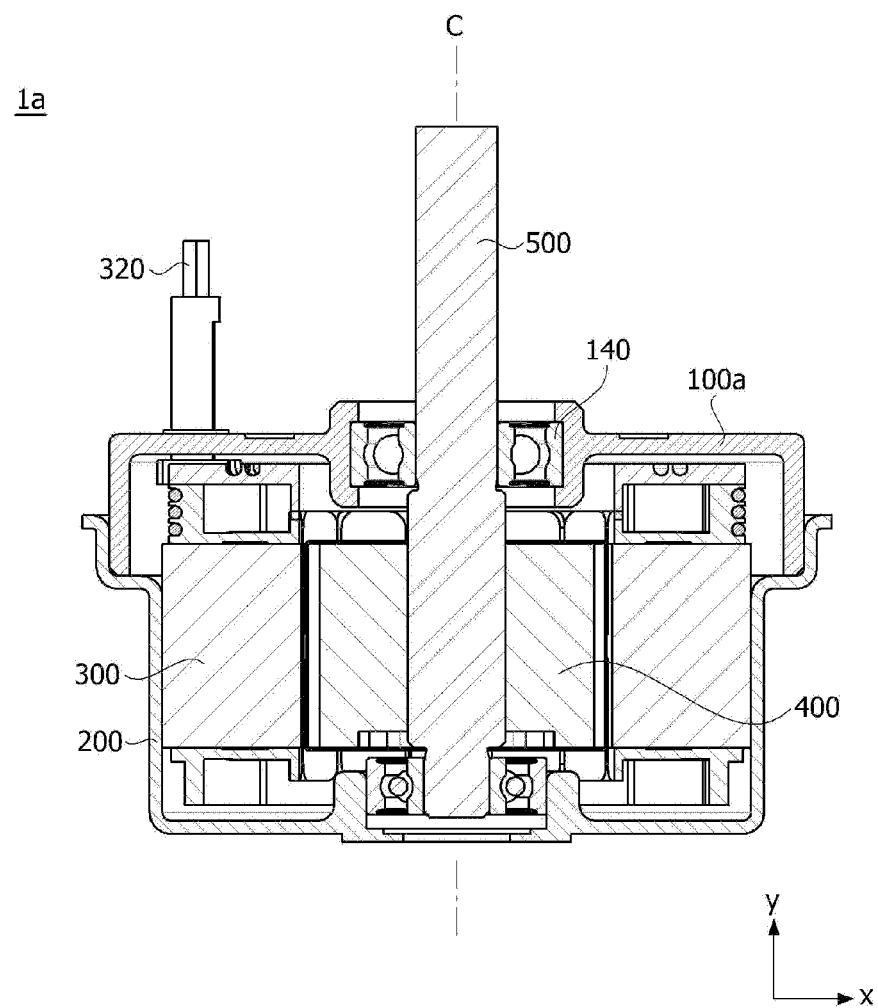

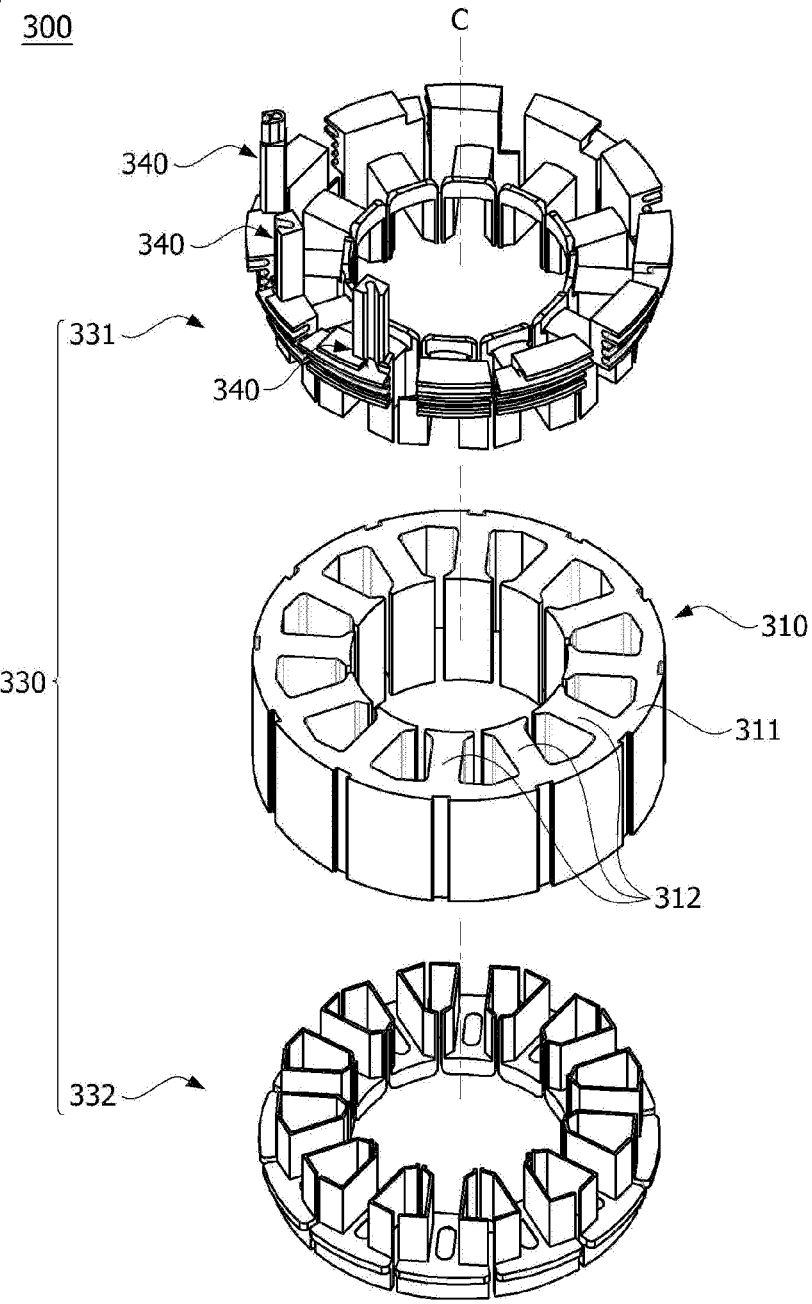

[FIG. 11]
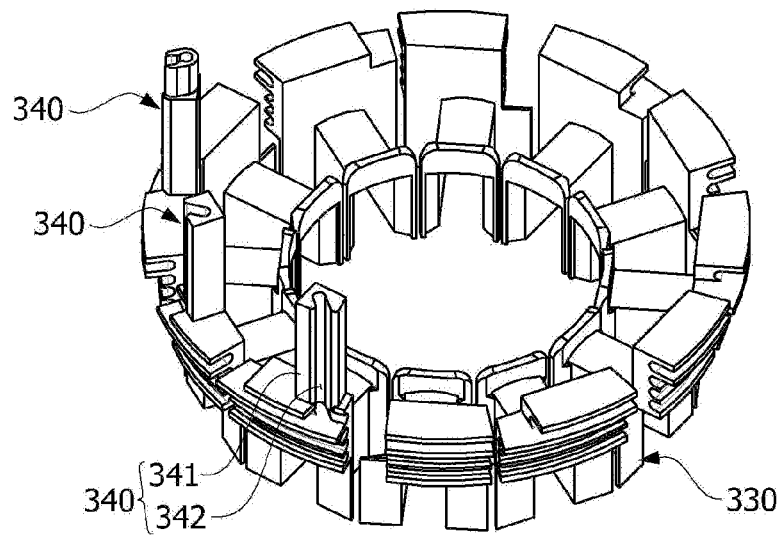
[FIG. 12]
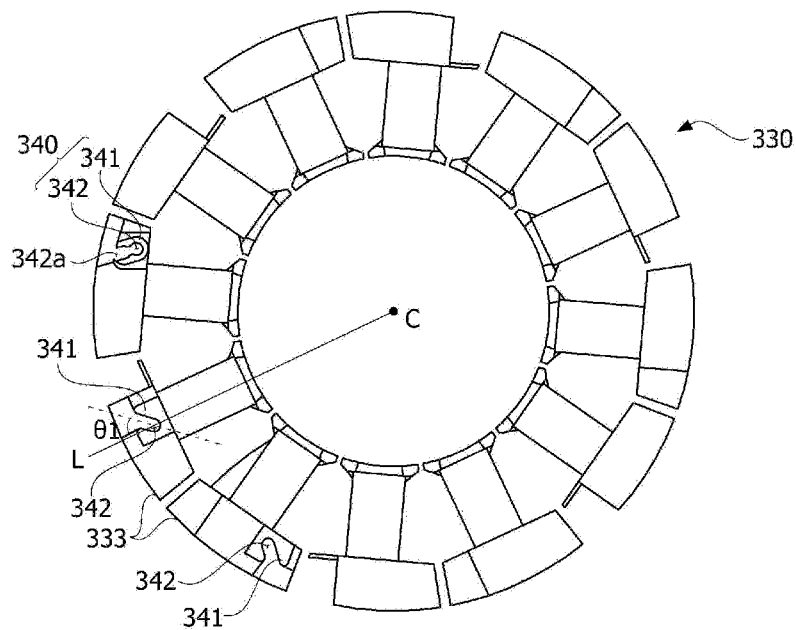

[FIG. 13]
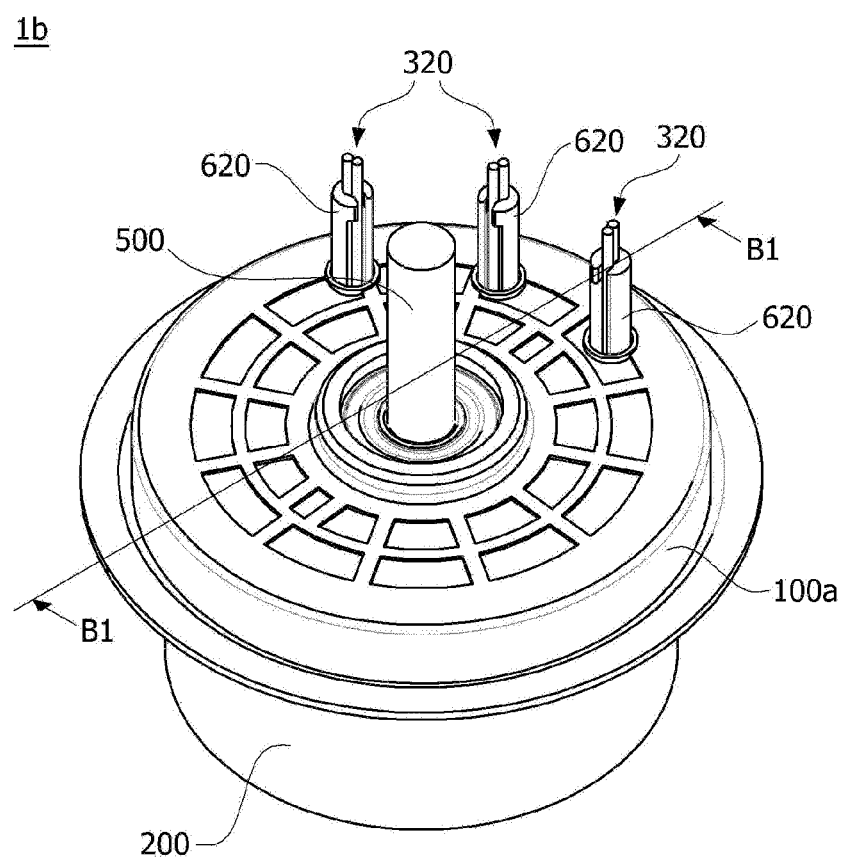

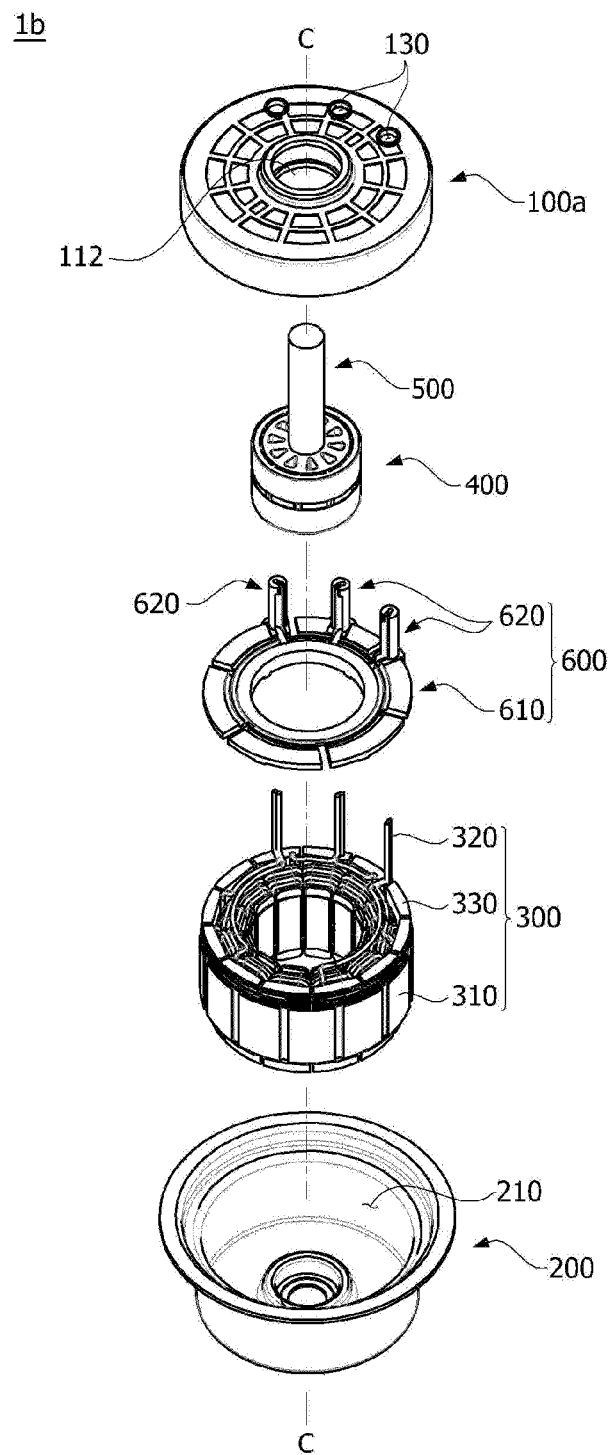
[FIG. 14]

[FIG. 15]
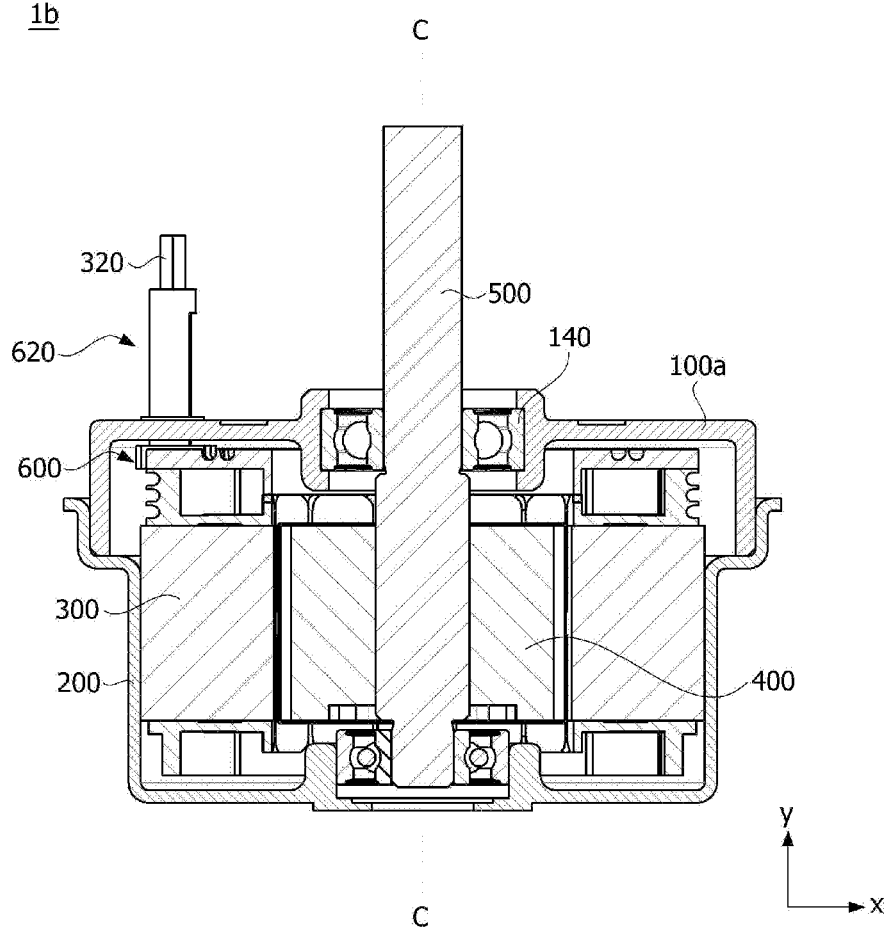

[FIG. 16]
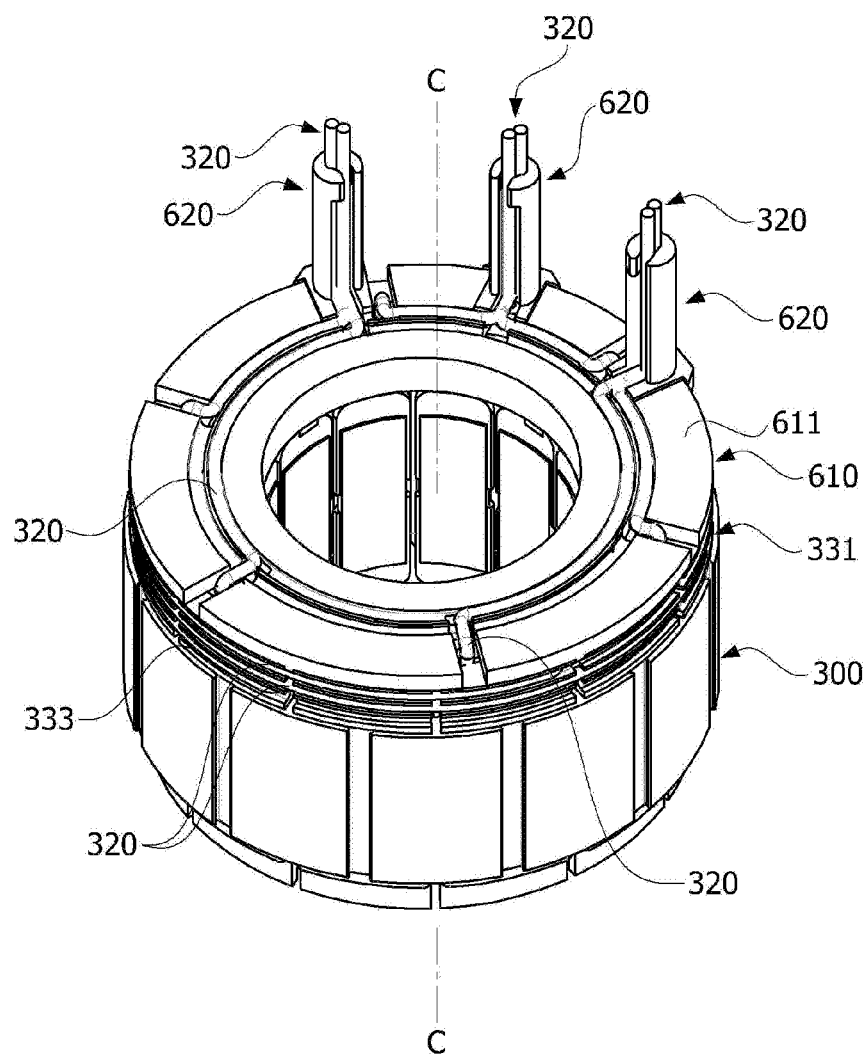

[FIG. 17]
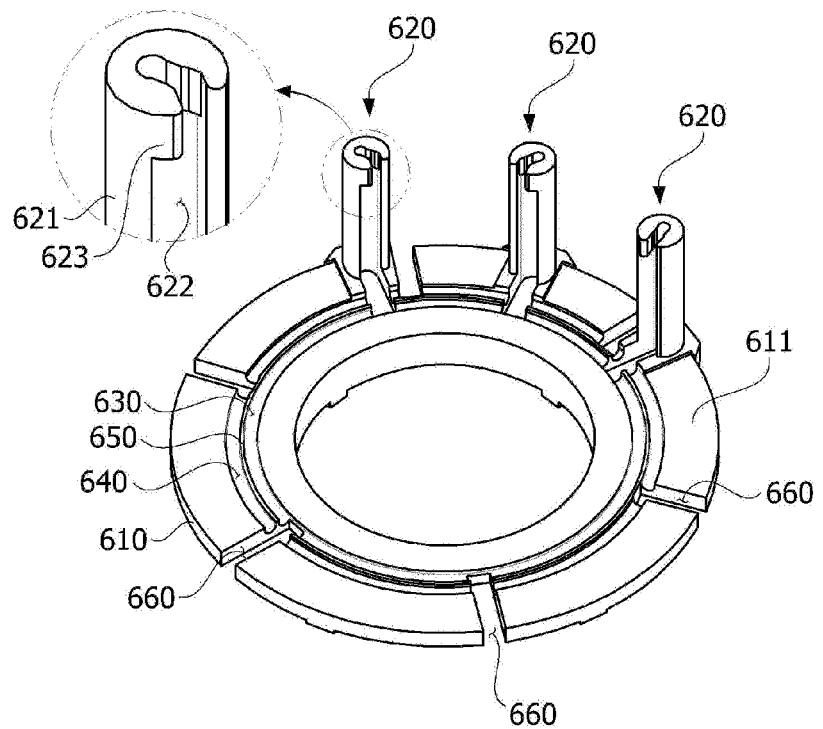

[FIG. 18]
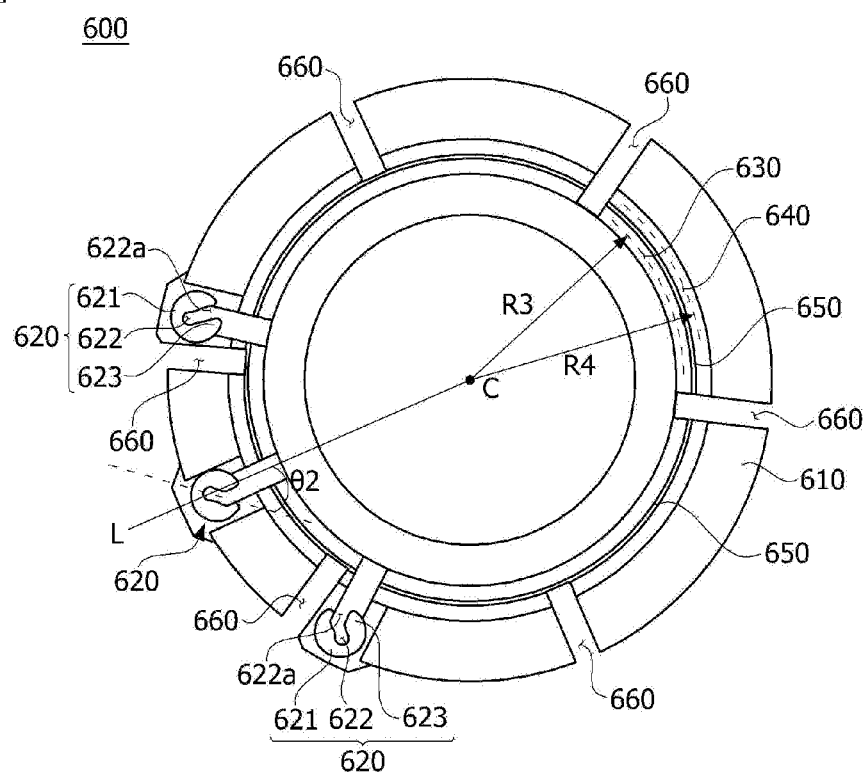

COVER ASSEMBLY AND MOTOR INCLUDING SAME

CROSS REFERENCE TO RELATED APPLICATIONS

This application is the National Phase of PCT/KR2017/012245 filed on Nov. 1, 2017, which claims priority under 35 U.S.C. § 119(a) to Patent Application Nos. 10-2016-0147625 and 10-2017-0030102 filed in the Republic of Korea on Nov. 7, 2016 and Mar. 9, 2017, all of which are hereby expressly incorporated by reference into the present application.

TECHNICAL FIELD

The present invention relates to a cover assembly and a motor including the same.

BACKGROUND ART

A motor is an apparatus configured to convert electric energy to rotational energy using a force applied to a conductor in a magnetic field. Recently, with the expansion of a use of the motor, the role of the motor has become important. Particularly, as more electric devices are used in a vehicle, demands for a motor applied to a steering system, a braking system, a machinery system, and the like are greatly increasing.

Generally, a motor includes a rotating shaft which is rotatably formed, a rotor coupled to the rotating shaft, and a stator fixed in a housing, and the stator is installed to be spaced a gap from a circumference of the rotor. In addition, coils, which generate a rotational magnetic field, are wound around the stator to induce an electrical interaction with the rotor so that the rotor rotates. As the rotor rotates, the rotating shaft rotates to generate a driving force.

In addition, a busbar electrically connected to the coils is disposed on an upper end of the stator. The busbar includes a busbar housing and a busbar terminal coupled to the busbar housing and connected to the coil. Here, the busbar terminal is formed by performing a pressing process on a metal plate such as a copper plate.

In this case, the busbar terminal may include a plurality of terminals directly connected to the coils. A part of each of the terminals may be bent due to a spatial limitation or a position of a connecting end of the coil.

In addition, the rotating shaft may be rotatably supported by a bearing in the housing. Here, the bearing may be disposed in the housing to be supported or may be press-fitted and installed in the busbar housing.

However, in the case of the above-described motor, since components have to be assembled through various assembly processes, there is a problem of increasing manufacturing costs.

In addition, since gaps are generated due to tolerances of the components, there is a problem of lowered reliability.

In addition, removing the busbar to decrease a size of the motor and meet performance is in demand according to user's requirements.

DISCLOSURE

Technical Problem

The present invention is directed to providing a cover assembly in which a bearing is disposed and by which coils are guided to the outside, and a motor including the same.

In addition, the present invention is directed to providing a motor which has a simplified structure, a reduced size, and a simplified assembly process due to an insert-injection molded bearing in the cover assembly.

Objectives that should be solved according to the embodiments are not limited to the above described objectives, and other objectives which are not described above will be clearly understood by those skilled in the art from the following specification.

Technical Solution

One aspect of the present invention provides a cover assembly including a cover body and a plurality of grooves formed in an upper surface of the cover body to guide a coil, wherein a hole is formed in one side of each of the grooves to pass through the cover body.

A first groove among the grooves may include a first curved portion formed to have a predetermined curvature; and a first extended portion which extends from the first curved portion in a radial direction, wherein the hole may be disposed in the first extended portion.

A second groove among the grooves may include a second curved portion formed to have a predetermined curvature and a second extended portion and a third extended portion which each extend from one side of the second curved portion in the radial direction, wherein the holes are disposed in the second extended portion and the third extended portion.

The third extended portion may be formed to extend from the second curved portion in the same direction as the second extended portion.

The curvature of the second curved portion may be greater than that of the first curved portion.

A third groove among the grooves may be formed in a 'v' shape, and the holes may be disposed in one side and the other side of the third groove.

The cover body may be formed of a synthetic resin material.

A bearing may be further disposed in the cover body by an insert injection method.

Another aspect of the present invention provides a motor including: a rotating shaft; a rotor coupled to the rotating shaft; a stator disposed outside the rotor; a coil wound around the stator; a housing which accommodates the rotor and the stator and in which an opening is formed at one side thereof; and a cover assembly which covers the opening, wherein the cover assembly includes a cover body which covers the opening, and holes formed in the cover body, and one region of the coil is disposed in the hole.

The cover assembly may further include a plurality of grooves formed in an upper surface of the cover body, one side of the hole may be disposed at one side of the groove, and one side of the coil may pass through the hole and be guided by the groove.

A first groove among the grooves may include a first curved portion formed to have a predetermined curvature and a first extended portion which extends from one side of the first curved portion in a radial direction, wherein the hole is disposed in the first extended portion.

A second groove among the grooves may include a second curved portion formed to have a predetermined curvature and a second extended portion and a third extended portion which each extend from one side of the second curved portion in the radial direction, wherein the holes may be disposed in the second extended portion and the third extended portion.

The third extended portion may be formed to extend from the second curved portion in the same direction as the second extended portion.

The curvature of the second curved portion may be greater than that of the first curved portion.

A third groove among the grooves may be formed in a 'v' shape, and the holes may be disposed in one side and the other side of the third groove.

A bearing may be further disposed in the cover body by an insert injection method, and the bearing may be disposed on an outer circumferential surface of the rotating shaft.

The stator may include: a stator core; a coil wound around the stator core; and an insulator interposed between the stator core and the coil, wherein the insulator includes a coil terminal which extends from an upper surface of the insulator in an axial direction, and the coil terminal, in which one region of the coil is disposed, may be disposed to pass through the hole.

The coil terminal may be disposed to pass through and protrude from the hole of the cover assembly.

The insulator may include a first insulator disposed on an upper portion of the stator core and a second insulator disposed on a lower portion of the stator core, wherein the coil terminal may be disposed on an upper portion of the first insulator.

The coil terminal may include a coil terminal body and a fourth groove formed in the coil terminal body, wherein the coil may be disposed in the fourth groove.

The fourth groove may include an opening which is long in a longitudinal direction of the coil terminal, and the opening may be disposed to face an outside of the stator.

The fourth groove may be disposed at a predetermined angle ($\theta 1$) with respect to a line (L) which passes through a center (C) of the stator in a radial direction.

The motor may further include a router disposed on the stator, wherein the router may include a router body and a coil terminal which extends from an upper surface of the router body in an axial direction, and the coil terminal may be disposed to pass through an inside of the hole formed in the cover assembly.

The coil terminal may include: a coil terminal body and a fifth groove formed in the coil terminal body, wherein the coil may be disposed in the fifth groove.

The fifth groove may include an opening which is long in a longitudinal direction of the coil terminal, and the opening may be disposed to face an inside of the stator.

The fifth groove may be disposed at a predetermined angle ($\theta 2$) with respect to a line (L) which passes through a center (C) of the router in a radial direction.

The coil terminal may further include a second protrusion disposed on one side of the coil terminal body, and the second protrusion may be disposed in the fifth groove and prevents departure of the coil.

A sixth groove and a seventh groove may be further disposed in an upper surface of the router, and a curvature of the sixth groove may be different from that of the seventh groove.

A first protrusion may be further interposed between the sixth groove and the seventh groove.

Advantageous Effects

According to embodiments, since coils are guided by holes formed in a cover assembly, assemblability of a motor can be improved.

Here, arrangement positions of end portions of coils can be adjusted using grooves disposed in an upper portion of a cover assembly.

In addition, assemblability of holes can be improved using coil terminals configured to guide coils to be arranged. Here, since the coil terminals are disposed above insulators, a busbar, which is conventionally used, can be removed, and thus a size of a motor can be decreased.

Meanwhile, in the case of a motor in which coil terminals are formed in a router, since coils are individually wound around each of a stator and a router, winding and routing can be excellently performed. In addition, since an assembly process for the router is performed after the coils are wound, the coil terminals can be adjusted to be arranged in consideration of required positions.

In addition, since a bearing is insert-injection-molded in the cover assembly, a structure can be simplified, and a size can be decreased. Accordingly, since additional processes or members for sealing the bearing are not needed, productivity of a motor can be improved.

Accordingly, a size of the motor including the cover assembly can be decreased.

A variety of useful advantages and effects are not limited to the above-described contents and will be more easily understood when specific embodiments of the present invention are described.

DESCRIPTION OF DRAWINGS

FIG. 1 is a perspective view illustrating a motor according to a first embodiment.

FIG. 2 is a plan view illustrating the motor according to the first embodiment.

FIG. 3 is a cross-sectional view illustrating the motor according to the first embodiment.

FIG. 4 is a perspective view illustrating a cover assembly of the motor according to the first embodiment.

FIG. 5 is a plan view illustrating the cover assembly of the motor according to the first embodiment.

FIG. 6 is a cross-sectional view illustrating the cover assembly of the motor according to the first embodiment.

FIG. 7 is a perspective view illustrating a motor according to a second embodiment.

FIG. 8 is an exploded perspective view illustrating the motor according to the second embodiment.

FIG. 9 is a cross-sectional view taken along line B-B of FIG. 7 illustrating the motor according to the second embodiment.

FIG. 10 is a view illustrating coupling of a stator core and an insulator which are disposed in the motor according to the second embodiment.

FIG. 11 is a perspective view illustrating a first insulator of the motor according to the second embodiment.

FIG. 12 is a plan view illustrating the first insulator of the motor according to the second embodiment.

FIG. 13 is a perspective view illustrating a motor according to a third embodiment.

FIG. 14 is an exploded perspective view illustrating the motor according to the third embodiment.

FIG. 15 is a cross-sectional view taken along line B1-B1 of FIG. 13 illustrating the motor according to the third embodiment.

FIG. 16 is a view illustrating coupling of a stator and a router which are disposed in the motor according to the third embodiment.

FIG. 17 is a perspective view illustrating the router of the motor according to the third embodiment.

FIG. 18 is a plan view illustrating the router of the motor according to the third embodiment.

MODES OF THE INVENTION

Since the invention allows for various changes and numerous embodiments, specific embodiments will be illustrated in the accompanying drawings and described in detail in the written description. However, this is not intended to limit the present invention to specific modes of practice, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited to these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

In the description of embodiments, when an element is referred to as being "on or under" another element, the term "on or under" refers to either a direct connection between two elements or an indirect connection between two elements having one or more elements formed therebetween. In addition, when the term "on or under" is used, it may refer to a downward direction as well as an upward direction with respect to an element.

The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, example embodiments of the invention will be described below in more detail with reference to the accompanying drawings, components that are the same or correspond to each other are rendered with the same reference numeral regardless of the figure number, and redundant descriptions thereof will be omitted.

Coils may be disposed in holes formed in a cover assembly of a motor according to the embodiments. Accordingly, one end of the coil may be guided to the outside by the hole. Here, the hole may be formed to pass through the cover assembly.

First Embodiment

FIG. 1 is a perspective view illustrating a motor according to a first embodiment, FIG. 2 is a plan view illustrating the motor according to the first embodiment, and FIG. 3 is a cross-sectional view illustrating the motor according to the first embodiment.

Referring to FIGS. 1 to 3, a motor 1 according to the first embodiment may include a cover assembly 100, a housing 200, a stator 300, coils 320, a rotor 400, and a rotating shaft 500 according to an embodiment. Here, the cover assembly 100 may be disposed to cover an open upper portion of the housing 200.

The cover assembly 100 and the housing 200 may form an exterior of the motor 1. Here, the housing 200 may be formed in a cylindrical shape having an opening formed in an upper portion thereof.

Accordingly, due to the cover assembly 100 and the housing 200 being coupled, an accommodation space may be formed therein. In addition, as illustrated in FIG. 2, the stator 300, the coils 320, the rotor 400, the rotating shaft 500, and the like may be disposed in the accommodation space.

The stator 300 may be supported by an inner circumferential surface of the housing 200. Here, the stator 300 is disposed outside the rotor 400.

The stator 300 may include a stator core and the coils 320 wound around the stator core to generate a rotating magnetic field. Here, the stator core may be formed as a single core or a plurality of separate cores which are coupled.

In addition, the stator core may be formed to have a form in which a plurality of plates having a thin steel plate shape are stacked on each other but is not necessarily limited thereto. For example, the stator core may also be formed as a single part.

A plurality of teeth may be formed to protrude from an outer circumferential surface of the stator core. The teeth may be disposed to protrude in a radial direction with respect to a center of the stator core. Here, the teeth may be disposed to face magnets. In addition, the coil 320 is wound around each of the teeth. Here, insulators (not shown) may be installed on the teeth. Accordingly, the insulators insulate the stator core from the coils 320.

Accordingly, when a current is supplied to the coil 320, an electrical interaction is induced between the coil 320 and the magnet so that the rotor 400 may rotate. In the case in which the rotor 400 rotates, the rotating shaft 500 also rotates with the rotor 400. Here, the rotating shaft 500 may be supported by a bearing 140.

The rotor 400 may be disposed inside the stator 300. In addition, the rotating shaft 500 may be coupled to a central portion of the rotor 400.

The rotor 400 may include a rotor core and the magnets. For example, the rotor 400 may be formed to have a form in which the magnets are disposed on an outer circumferential surface of the rotor core.

Here, the magnets and the coils 320 wound around the stator 300 generate a rotating magnetic field. In addition, the magnets may be disposed such that N and S poles thereof are alternately positioned in a circumferential direction about the rotating shaft 500.

Accordingly, the rotor 400 rotates due to an electrical interaction between the coils 320 and the magnets, and when the rotor 400 rotates, the rotating shaft 500 rotates to generate a driving force.

Meanwhile, the rotor core of the rotor 400 may be manufactured to have a form in which a plurality of separate cores are coupled or a single core is formed as a single cylinder.

As illustrated in FIG. 2, the rotating shaft 500 may be rotatably supported by the bearing 140 of the cover assembly 100 in the housing 200.

FIG. 4 is a perspective view illustrating a cover assembly of the motor according to the first embodiment, FIG. 5 is a plan view illustrating the cover assembly of the motor according to the first embodiment, and FIG. 6 is a cross-sectional view illustrating the cover assembly of the motor according to the first embodiment. Here, FIG. 6 is the cross-sectional view taken along line A-A of FIG. 5 illustrating the cover assembly.

Hereinafter, the cover assembly 100 according to the embodiment will be described with reference to FIGS. 4 to 6.

The cover assembly 100 may be disposed to cover an opening of the housing 200.

The cover assembly 100 may include a cover body 110, a plurality of grooves 120, holes 130 which are formed in one sides of the grooves 120, and the bearing 140.

The cover body 110 may be formed to cover the opening of the housing 200. Here, the cover body 110 may be formed in a disc shape and formed of an insulating material. For example, the cover body 110 may be formed of a synthetic resin material such as mold.

In addition, an arrangement hole 112 may be formed at a center C of the cover body 110 such that the rotating shaft 500 is disposed therein.

The plurality of grooves 120 may be formed in an upper surface 111 of the cover body 110.

The groove 120 may be formed in a groove shape having an opening. In addition, the coil 320 may be guided along the groove 120. In addition, the hole 130 may be disposed in one side of the groove 120.

The groove 120 may include a first groove 120a, a second groove 120b, and a third groove 120c.

The first groove 120a may include a first curved portion 121 which is formed to have a predetermined curvature of 1/R1 and a first extended portion 122 which extends from the first curved portion 121 in a radial direction with respect to the center C of the cover body 110.

In addition, the hole 130 may be disposed in the first extended portion 122.

Accordingly, as illustrated in FIG. 3, one side of the coil 320 wound around the stator 300 may pass through the hole 130 disposed in the first extended portion 122 and may be disposed along the first extended portion 122. That is, the coil 320, which passes through the hole 130, is guided to be arranged by the first extended portion 122. Then, the coil 320 is guided to the other side of the first curved portion 121 by the first curved portion 121 disposed on one side of the first extended portion 122.

The second groove 120b may include a second curved portion 123 formed to have a predetermined curvature of 1/R2, a second extended portion 124 which extends from one end portion of the second curved portion 123 in the radial direction with respect to the center C of the cover body 110, and a third extended portion 125 which extends from an outer side of the second curved portion 123 in the radial direction with respect to the center C of the cover body 110.

Here, the curvature of 1/R2 of the second curved portion 123 may be greater than the curvature of 1/R1 of the first curved portion 121. That is, on the basis of the center C, a radius R2 of the second curved portion 123 may be greater than a radius R1 of the first curved portion 121.

Accordingly, as illustrated in FIG. 5, the second curved portion 123 may be disposed further inward than the first curved portion 121. Here, the term 'inward' may refer to a direction toward the center C in the radial direction. In addition, the term 'outward' may refer to a direction opposite to 'inward'.

The second extended portion 124 and the third extended portion 125 may be disposed to be spaced apart from each other by a predetermined distance d. In addition, the third extended portion 125 may be formed to extend from the second curved portion 123 in the same direction as the second extended portion 124.

In addition, the holes 130 may be disposed in the second extended portion 124 and the third extended portion 125.

As illustrated in FIG. 3, one side of the coil 320 wound around the stator 300 passes through the hole 130 disposed in the second extended portion 124 and is guided by the second extended portion 124. Then, the coil 320 is guided to the other side of the second curved portion 123 by the second curved portion 123 disposed on one side of the second extended portion 124.

As illustrated in FIG. 3, one side of the coil 320 wound around the stator 300 passes through the hole 130 disposed in the third extended portion 125, and one side of the coil 320 is guided to be arranged along the third extended portion 125. Then, the coil 320 is guide to the other side of the second curved portion 123 by the second curved portion 123 disposed to extend from one side of the third extended portion 125.

Here, a guide protrusion (not shown) may be disposed on the second curved portion 123.

The guide protrusion may be formed to protrude upward from a lower surface 123a of the second curved portion 123. In addition, the guide protrusion may be disposed on a center of the second curved portion 123.

Accordingly, the coil 320 guided by the second extended portion 124 meets the coil 320 guided by the third extended portion 125 at one region of the second curved portion 123. In addition, the coil 320 guided by the second extended portion 124 and the coil 320 guided by the third extended portion 125 are separated by the guide protrusion and guided along the second curved portion 123.

As illustrated in FIG. 5, the third groove 120c may be formed in a 'v' shape. In addition, the holes 130 may be formed in one and the other sides of the third groove 120c.

As illustrated in FIG. 3, one side of the coil 320 wound around the stator 300 may pass through the hole 130 disposed in the third groove 120c and may be guided by the third groove 120c. That is, the coils 320 exposed to the outside through the holes 130 formed at one and the other sides of the third groove 120c may be guided to a bent region of a central portion of the third groove 120c by the third groove 120c.

The hole 130 may be formed to pass through the cover body 110. Here, the hole 130 may be formed in the same direction as an axial direction of the rotating shaft 500. In addition, one region of the coil 320 may be disposed in the hole 130.

In addition, one side of the hole 130 may be disposed in the groove 120.

Accordingly, the coil 320 wound around the stator 300 may be exposed outside the motor 1 through the hole 130. In addition, the exposed coil 320 may be guided by the groove 120.

The bearing 140 may rotatably support the rotating shaft 500. As illustrated in FIG. 2, the bearing 140 may be disposed on an outer circumferential surface of the rotating shaft 500.

Meanwhile, the bearing 140 may be disposed in the cover body 110. That is, the bearing 140 may be disposed in the cover body 110 by an insert injection method and may rotatably support the rotating shaft 500.

FIGS. 7 to 12 are views illustrating a motor 1a according to a second embodiment, and FIGS. 13 to 18 are views illustrating a motor 1b according to a third embodiment.

In the motor 1a or 1b according to the embodiment, coil terminals which guide end sides of coils to be arranged may be coupled to holes of a cover assembly to improve assemblability. In addition, in the motor 1a or 1b, since the coil terminals are assembled with the cover assembly by an insertion method, assembly tolerances may be minimized.

Second Embodiment

FIG. 7 is a perspective view illustrating a motor according to a second embodiment, FIG. 8 is an exploded perspective view illustrating the motor according to the second embodiment, and FIG. 9 is a cross-sectional view taken along line B-B of FIG. 7 illustrating the motor according to the second embodiment. Here, an x direction refers to a radial direction and y direction refers to an axis direction in FIG. 9.

Referring to FIGS. 7 to 9, the motor 1a according to the second embodiment may include a cover assembly 100a, a housing 200, a stator 300, a rotor 400, and a rotating shaft 500. Here, the cover assembly 100a may be disposed to cover an open upper portion of the housing 200. In addition, the stator 300 may include a stator core 310, coils 320, and insulators 330. In addition, first coil terminals 340 may be formed on the insulators 330. Here, the coil terminals may refer to terminals.

The cover assembly 100a and the housing 200 may form an exterior of the motor 1a. Here, the housing 200 may be formed in a cylindrical shape having an opening formed in an upper portion thereof.

Accordingly, due to the cover assembly 100a and the housing 200 being coupled, an accommodation space may be formed therein. In addition, as illustrated in FIG. 9, the stator 300, the rotor 400, the rotating shaft 500, and the like may be disposed in the accommodation space.

The cover assembly 100a may be disposed to cover an opening 210 of the housing 200.

Referring to FIGS. 8 and 9, the cover assembly 100a may include a cover body 110, holes 130, and a bearing 140.

The cover body 110 may be disposed to cover the opening 210 of the housing 200. Here, the cover body 110 may be formed in a disc shape and formed of an insulating material. For example, the cover body 110 may be formed of a synthetic resin material such as mold.

In addition, an arrangement hole 112 may be formed at a center C of the cover body 110 such that the rotating shaft 500 is disposed therein. Here, the center C is a center of the motor 1a.

The holes 130 may be formed to pass through the cover body 110. As illustrated in FIG. 8, at least three holes 130 may be formed. In addition, the three holes 130 may be formed to be spaced apart from each other in a circumferential direction about the center C.

Here, the three holes 130 are exemplified as being disposed in the motor 1a, but the present invention is not necessarily limited thereto, and the number of holes 130 may be adjusted according to the number of phases of the motor.

The first coil terminal 340 may pass through an inside of the hole 130 and be coupled thereto. Here, the hole 130 guides the first coil terminal 340 of the stator 300 such that the first coil terminal 340 is disposed in the hole 130, and thus the first coil terminal 340 is disposed at a preset position.

The bearing 140 may rotatably support the rotating shaft 500. As illustrated in FIG. 9, the bearing 140 may be disposed on an outer circumferential surface of the rotating shaft 500.

Meanwhile, the bearing 140 may be disposed in the cover body 110. That is, the bearing 140 may be disposed in the cover body 110 by an insert injection method and may rotatably support the rotating shaft 500.

The stator 300 may be supported by an inner circumferential surface of the housing 200. In addition, the stator 300 is disposed outside the rotor 400. That is, the rotor 400 may be disposed inside the stator 300.

Referring to FIGS. 8 and 10, the stator 300 may include the stator core 310, the coils 320 wound around the stator core 310, and the insulators 330 interposed between the stator core 310 and the coils 320. Here, a wire having a coated outer circumferential surface may also be provided as the coil 320.

The coil 320 configured to generate a rotating magnetic field may be wound around the stator core 310. Here, the stator core 310 may be formed as a single core or a plurality of separate cores which are coupled.

The stator core 310 may be formed to have a form in which a plurality of plates having a thin steel plate shape are stacked on each other but is not necessarily limited thereto. For example, the stator core 310 may also be formed as a single part.

The stator core 310 may include a yoke 311 having a cylindrical shape and a plurality of teeth 312.

Here, the teeth 312 may be disposed to protrude in the radial direction (x direction) with respect to a center C of the stator core 310. In addition, the plurality of teeth 312 may be disposed to be spaced apart from each other in a circumferential direction of the yoke 311. Accordingly, slots may be formed between the teeth 312.

Meanwhile, the teeth 312 may be disposed to face magnets of the rotor 400. In addition, the coils 320 are wound around the teeth 312.

The insulators 330 insulate the stator core 310 from the coils 320. Accordingly, the insulators 330 may be interposed between the stator core 310 and the coils 320.

Accordingly, the coils 320 may be wound around the stator core 310 on which the insulators 330 are disposed.

As illustrated in FIG. 10, the insulators 330 may include a first insulator 331 disposed on an upper portion of the stator core 310 and a second insulator 332 disposed on a lower portion of the stator core 310.

The first coil terminal 340 may be formed to extend in an axial direction from an upper surface of the insulator 330. In addition, the first coil terminal 340 may guide one region of the coil 320.

For example, the first coil terminal 340 may be disposed on the first insulator 331. In addition, the first coil terminal 340 may be integrally formed with the first insulator 331.

The first coil terminal 340 may be coupled to the hole 130. As illustrated in FIG. 7, the first coil terminal 340 may be disposed to pass through and protrude from the hole 130 of the cover assembly 100a. Here, three first coil terminals 340 may be provided.

Referring to FIG. 11, the first coil terminals 340 may include coil terminal bodies 341 and fourth grooves 342.

The coil terminal body 341 may be disposed to protrude from an upper portion of the first insulator 331. In addition, the coil terminal body 341 may be integrally formed with the first insulator 331.

The fourth groove 342 may be concavely formed in the coil terminal body 341. In addition, the coil 320 may be disposed in the fourth groove 342. Here, the coil 320 may be disposed in the fourth groove 342 by an insert fitting method.

Accordingly, the fourth groove 342 may guide the coil 320 to be arranged. In addition, the concave fourth groove 342 may prevent movement of the coil 320.

As illustrated in FIG. 11, the fourth groove 342 may be long in a longitudinal direction of the coil terminal body 341.

For example, the fourth groove 342 may be long from a lower end to an upper end of the coil terminal body 341. Here, as illustrated in FIG. 7, an end portion of the coil 320 may be disposed to be exposed from the fourth groove 342.

Meanwhile, openings 342a of the fourth grooves 342 may be disposed to face an outside of the stator 300. That is, the opening of the fourth groove 342 may be disposed in a direction opposite to a direction (inward direction) toward the center C. Here, an inward direction refers to a direction toward the center C, and an outward direction refers to a direction opposite to the inward direction.

For example, as illustrated in FIG. 12, the fourth groove 342 may be disposed to be spaced apart from the center C of the stator 300 in the radial direction. In addition, the fourth grooves 342 may be radially disposed with respect to the center C of the stator 300.

Meanwhile, the fourth groove 342 may be disposed at a predetermined angle θ1 with respect to a line L which passes through the center C of the stator 300 in the radial direction. As illustrated in FIG. 12, the opening 342a of the fourth groove 342 may be disposed to have the predetermined angle θ1 with respect to the line L.

Accordingly, the coil 320 is wound around the first insulator 331 in a circumferential direction of the first insulator 331, and the coil 320 may be guided to be arranged by the fourth groove 342.

Meanwhile, when a current is supplied to the coil 320, an electrical interaction with the magnets is induced so that the rotor 400 may rotate. In the case in which the rotor 400 rotates, the rotating shaft 500 also rotates together therewith. Here, the rotating shaft 500 may be supported by the bearing 140.

The rotor 400 may be disposed inside the stator 300. In addition, the rotating shaft 500 may be coupled to a central portion of the rotor 400.

A rotor core may be coupled to the magnets to form the rotor 400. For example, the rotor 400 may be formed to have a form in which the magnets are disposed on an outer circumferential surface of the rotor core.

Accordingly, the magnets and the coils 320 wound around the stator 300 generate a rotating magnetic field. The magnets may be disposed such that N and S poles thereof are alternately positioned in a circumferential direction about the rotating shaft 500.

Accordingly, the rotor 400 rotates due to an electrical interaction between the coils 320 and the magnets, and when the rotor 400 rotates, the rotating shaft 500 rotates to generate a driving force of the motor 1a.

Meanwhile, the rotor core of the rotor 400 may be manufactured to have a form in which a plurality of separate cores are coupled or a single core is formed as a single cylinder.

As illustrated in FIG. 9, the rotating shaft 500 may be rotatably supported by the bearing 140 of the cover assembly 100a in the housing 200.

Third Embodiment

FIG. 13 is a perspective view illustrating a motor according to a third embodiment, FIG. 14 is an exploded perspective view illustrating the motor according to the third embodiment, and FIG. 15 is a cross-sectional view taken along line B1-B1 of FIG. 13 illustrating the motor according to the third embodiment.

Hereinafter, when the motor 1b according to the third embodiment is described, since the same components as those of the motor 1a according to the second embodiment refer to the same symbols, detailed descriptions thereof will be omitted.

Referring to FIGS. 13 to 15, the motor 1b according to the third embodiment may include a cover assembly 100a, a housing 200, a stator 300, a rotor 400, a rotating shaft 500, and a router 600. Here, the cover assembly 100a may be disposed to cover an open upper portion of the housing 200. In addition, the router 600 may include a router body 610 and second coil terminals 620.

The cover assembly 100a and the housing 200 may form an exterior of the motor 1b. Here, the housing 200 may be formed in a cylindrical shape having an opening formed in an upper portion thereof.

Accordingly, due to the cover assembly 100a and the housing 200 being coupled, an accommodation space may be formed therein. In addition, as illustrated in FIG. 15, the stator 300, the rotor 400, the rotating shaft 500, the router 600, and the like may be disposed in the accommodation space.

The cover assembly 100a may be disposed to cover an opening 210 of the housing 200.

Referring to FIGS. 14 and 15, the cover assembly 100a may include a cover body 110, holes 130, and a bearing 140.

The cover body 110 may be disposed to cover the opening 210 of the housing 200. Here, the cover body 110 may be formed in a disc shape and formed of an insulating material. For example, the cover body 110 may be formed of a synthetic resin material.

In addition, an arrangement hole 112 may be formed at a center C of the cover body 110 such that the rotating shaft 500 is disposed therein. Here, the center C is a center of the motor 1b.

The holes 130 may be formed to pass through the cover body 110. As illustrated in FIG. 14, at least three holes 130 may be formed. In addition, the three holes 130 may be formed to be spaced apart from each other in a circumferential direction about the center C.

Here, the three holes 130 are exemplified as being disposed in the motor 1b, but the present invention is not necessarily limited thereto, and the number of holes 130 may be adjusted according to the number of phases of the motor.

The second coil terminal 620 may pass through an inside of the hole 130 and be coupled thereto. Here, the hole 130 guides the second coil terminal 620 such that the second coil terminal 620 is disposed at a preset position.

The bearing 140 may rotatably support the rotating shaft 500. As illustrated in FIG. 15, the bearing 140 may be disposed on an outer circumferential surface of the rotating shaft 500.

Meanwhile, the bearing 140 may be disposed in the cover body 110. That is, the bearing 140 may be disposed in the cover body 110 by an insert injection method and may rotatably support the rotating shaft 500.

The stator 300 may be supported by an inner circumferential surface of the housing 200. In addition, the stator 300 is disposed outside the rotor 400. That is, the rotor 400 may be disposed inside the stator 300.

Referring to FIG. 14, the stator 300 may include a stator core 310, coils 320 wound around the stator core 310, and insulators 330 interposed between the stator core 310 and the coils 320. Here, a wire having a coated outer circumferential surface may also be provided as the coil 320.

The coil 320 configured to generate a rotating magnetic field may be wound around the stator core 310. Here, the stator core 310 may be formed as a single core or a plurality of separate cores which are coupled.

The stator core 310 may be formed to have a form in which a plurality of plates having a thin steel plate shape are stacked on each other but is not necessarily limited thereto. For example, the stator core 310 may also be formed as a single part.

The stator core 310 may include a yoke 311 having a cylindrical shape and a plurality of teeth 312.

Here, the teeth 312 may be disposed to protrude in a radial direction with respect to a center C of the stator core 310. In addition, the plurality of teeth 312 may be disposed to be spaced apart from each other in a circumferential direction of the yoke 311. Accordingly, slots may be formed between the teeth 312.

Meanwhile, the teeth 312 may be disposed to face magnets of the rotor 400. In addition, the coils 320 are wound around the teeth 312.

The insulators 330 insulate the stator core 310 from the coils 320. Accordingly, the insulators 330 may be interposed between the stator core 310 and the coil 320.

Referring to FIG. 10, the insulators 330 may include a first insulator 331 disposed on an upper portion of the stator core 310 and a second insulator 332 disposed on a lower portion of the stator core 310. Here, each of the first insulator 331 and the second insulator 332 may include a plurality of insulator members or a single insulator member.

The insulators 330 according to the embodiment is exemplified to include the first insulator 331 and the second insulator 332 which are respectively coupled to the upper portion and the lower portion of the stator core 310 but are not necessarily limited thereto. For example, the insulators 330 may also be disposed on the stator core 310 by an insert injection method.

Accordingly, the coils 320 may be wound around the stator core 310 on which the insulators 330 are disposed.

Here, as illustrated in FIG. 16, the coil 320 may be wound around a side of the tooth 312 and wound around an outer circumferential surface 333 of the first insulator 331. That is, the coil 320 may be wound around the side of the tooth 312 and wound in a circumferential direction of the first insulator 331.

Meanwhile, when a current is supplied to the coil 320, an electrical interaction with the magnet is induced so that the rotor 400 may rotate. In the case in which the rotor 400 rotates, the rotating shaft 500 also rotates together therewith. Here, the rotating shaft 500 may be supported by the bearing 140.

The rotor 400 may be disposed inside the stator 300. In addition, the rotating shaft 500 may be coupled to a central portion of the rotor 400.

A rotor core may be coupled to the magnets to form the rotor 400. For example, the rotor 400 may be formed to have a form in which the magnets are disposed on the outer circumferential surface of the rotor core.

Accordingly, the magnets and the coils 320 wound around the stator 300 generate a rotating magnetic field. The magnets may be disposed such that N and S poles thereof are alternately positioned in a circumferential direction about the rotating shaft 500.

Accordingly, the rotor 400 rotates due to an electrical interaction between the coils 320 and the magnets, and when the rotor 400 rotates, the rotating shaft 500 rotates to generate a driving force of the motor 1b.

Meanwhile, the rotor core of the rotor 400 may be manufactured to have a form in which a plurality of separate cores are coupled or a single core is formed as a single cylinder.

As illustrated in FIG. 15, the rotating shaft 500 may be rotatably supported by the bearing 140 of the cover assembly 100a in the housing 200.

The router 600 may be disposed on the stator 300. As illustrated in FIG. 16, the router 600 guides the coil 320 of the stator 300 such that the coil 320 may be disposed at a predetermined position.

FIG. 17 is a perspective view illustrating the router of the motor according to the third embodiment, and FIG. 18 is a plan view illustrating the router of the motor according to the third embodiment.

Referring to FIGS. 17 and 18, the router 600 may include the router body 610 and the second coil terminals 620.

The router body 610 may be formed in a disc shape. In addition, the router body 610 may be formed of a synthetic resin material.

A sixth groove 630 and a seventh groove 640 may be formed in an upper surface 611 of the router body 610. In addition, each of the sixth groove 630 and the seventh groove 640 may be formed in a groove shape having an opening which is formed upward.

Accordingly, as illustrated in FIG. 16, any one of the coils 320 of the stator 300 may be guided to be arranged by the sixth groove 630 or the seventh groove 640 and may be guided by the second coil terminal 620.

The sixth groove 630 and the seventh groove 640 may be formed in the circumferential direction about the center C. Here, curvatures of 1/R3 and 1/R4 of the sixth groove 630 and the seventh groove 640 may be different. That is, radii of R3 and R4 of the sixth groove 630 and the seventh groove 640 may be different. Accordingly, the coils 320 which are guided to be arranged by the sixth groove 630 and the seventh groove 640 may be disposed such that the coils 320 do not intersect.

Meanwhile, a first protrusion 650 may be further interposed between the sixth groove 630 and the seventh groove 640. Here, as illustrated in FIG. 17, the first protrusion 650 may be formed to protrude in the circumferential direction about the center C. Accordingly, the first protrusion 650 may prevent interference between the coils 320 disposed along the sixth groove 630 and the seventh groove 640.

In addition, cut portions 660 in which some regions are cut may further be formed in the router body 610. The cut portions 660 may be formed from an outer side of router body 610 in a radial direction. Accordingly, the plurality of coils 320 may be guided to be arranged by the sixth groove 630 or the seventh groove 640 through the cut portions 660 while the plurality of coils 320 are not interfered therewith.

Meanwhile, the second coil terminal 620 may be formed to protrude from the upper surface 611 of the router body 610 in an axial direction. Here, the second coil terminal 620 may be disposed further outward than the seventh groove 640. In addition, the second coil terminal 620 may guide one region of the coil 320.

The second coil terminals 620 may be integrally formed with the router body 610.

The second coil terminals 620 may be coupled to the holes 130. As illustrated in FIG. 15, the second coil terminals 620 may be disposed to pass through and protrude from the holes 130 of the cover assembly 100a. Here, three second coil terminals 620 may be provided.

Referring to FIG. 17, the second coil terminals 620 may include coil terminal bodies 621, fifth grooves 622, and second protrusions 623.

The coil terminal bodies 621 may be disposed to protrude from an upper portion of the router body 610. In addition, the coil terminal bodies 621 may be integrally formed with the router body 610.

The fifth groove 622 may be concavely formed in the coil terminal body 621. In addition, the coil 320 may be formed in the fifth groove 622. Here, the coil 320 may be disposed in the fifth groove 622 by an insert fitting method.

Accordingly, the fifth groove 622 may guide the coil 320 to be arranged. In addition, the concave fifth groove 622 may prevent movement of the coil 320.

As illustrated in FIG. 17, the fifth groove 622 may be long in a longitudinal direction of the coil terminal body 621.

For example, the fifth groove 622 may be long from a lower end to an upper end of the coil terminal body 621. Here, as illustrated in FIG. 16, an end portion of the coil 320 may be disposed to be exposed from the fifth groove 622.

Meanwhile, an opening 622a of the fifth groove 622 may be disposed to face an inner side of the router 600. That is, the opening 622a of the fifth groove 622 may be disposed in an inward direction toward the center C.

As illustrated in FIG. 18, the fifth grooves 622 may be disposed to be spaced apart from a center C of the router 600 in a radial direction. In addition, the fifth grooves 622 may be radially disposed with respect to the center C of the router 600.

Meanwhile, the fifth groove 622 may be disposed to have a predetermined angle θ2 with respect to a line L which passes through the center C of the router 600. As illustrated in FIG. 18, the opening 622a of the fifth groove 622 may be disposed to have the angle θ2 having a predetermined slope with respect to the line L.

Accordingly, the coil 320 is disposed along the sixth groove 630 or the seventh groove 640, and the coil 320 may be guided to be arranged by the fifth groove 622.

The second protrusion 623 may be formed from one side of the fifth groove 622. As illustrated in FIG. 17, the second protrusion 623 may be formed to protrude from a side of the opening 622a of the fifth groove 622. Here, the second protrusion 623 may be disposed on an upper portion of the coil terminal body 621.

Accordingly, the second protrusion 623 may prevent departure of the coil 320 disposed in the fifth groove 622.

Although the present invention has been described with reference to the embodiments thereof, it will be understood by those skilled in the art that the invention may be variously changed and modified without departing from the spirit and scope of the present invention appended in the following claims. In addition, it should be interpreted that the differences related to the change and modification fall within the range of the present invention defined by the appended claims.

| [Reference Numerals] | |
|---|---|
| 1, 1a, 1b: MOTOR | 100, 100a: COVER ASSEMBLY |
| 110: COVER BODY | 120: GROOVE |
| 120a: FIRST GROOVE | 120b: SECOND GROOVE |
| 120c: THIRD GROOVE | |
| 130: HOLE | 140: BEARING |
| 200: HOUSING | 300: STATOR |
| 320: COIL | 330: INSULATOR |
| 340, 620: COIL TERMINAL | 342: FOURTH GROOVE |
| 622: FIFTH GROOVE | 630: SIXTH GROOVE |
| 640: SEVENTH GROOVE | 650: FIRST PROTRUSION |

The invention claimed is:

1. A cover assembly comprising:
a cover body; and
a plurality of grooves formed in an upper surface of the cover body to guide a coil,
wherein a hole is formed in one side of each of the grooves to pass through the cover body,
wherein a first groove among the grooves includes:
a first curved portion have a predetermined radius of curvature with respect to a center of the cover body, the first curved portion extending in a circumferential direction; and
a first extended portion which extends from the first curved portion in a radial direction with respect to the center of the cover body,
wherein the first extended portion is located radially outwardly from the first curved portion, and
wherein a first hole among the holes is disposed in the first extended portion.

2. The cover assembly of claim 1, wherein a second groove among the grooves includes:
a second curved portion formed to have a predetermined radius of curvature with respect to the center of the cover body, the second curved portion extending in the circumferential direction; and
a second extended portion and a third extended portion which each extend from one side of the second curved portion in the radial direction,
wherein a second hole among the holes is disposed in the second extended portion and a third hole among the holes is disposed in the third extended portion.

3. The cover assembly of claim 2, wherein the third extended portion is formed to extend from the second curved portion in the same direction as the second extended portion.

4. The cover assembly of claim 2, wherein the curvature of the second curved portion is greater than that of the first curved portion.

5. The cover assembly of claim 2, wherein:
a third groove among the grooves is formed in a 'v' shape; and
a fourth hole among the holes is disposed in a first side of the third groove and a fifth hole among the holes is disposed in a second side of the third groove.

6. A motor comprising:
a rotating shaft;
a rotor coupled to the rotating shaft;
a stator disposed outside the rotor;
a coil wound around the stator;

a housing which accommodates the rotor and the stator and in which an opening is formed at one side thereof; and a cover assembly which covers the opening, wherein the cover assembly includes a cover body, which covers the opening, a plurality, of grooves formed in an upper surface of the cover body to guide the coil, and a hole formed in one side of each of the grooves to pass through the cover body, wherein a first groove among the grooves includes:
a first curved portion having a predetermined radius of curvature with respect to a center of the cover body, the first curved portion extending in a circumferential direction; and
a first extended portion which extends from the first curved portion in a radial direction with respect to the center of the cover body, and wherein the first extended portion is located radially outwardly from the first curved portion.

7. The motor of claim 6,
wherein one side of the coil passes through a first hole among the holes and is guided by the first groove.

8. The motor of claim 7,
wherein the first hole is disposed in the first extended portion.

9. The motor of claim 8, wherein a second groove among the grooves includes:
a second curved portion having a predetermined radius of curvature with respect to the center of the cover body; and
a second extended portion and a third extended portion which each extend from one side of the second curved portion in the radial direction,
wherein a second hole among the holes is disposed in the second extended portion and a third hole among the holes is disposed in the third extended portion.

10. The motor of claim 9, wherein the third extended portion is formed to extend from the second curved portion in the same direction as the second extended portion.

11. The motor of claim 9, wherein the curvature of the second curved portion is greater than that of the first curved portion.

12. The motor of claim 9, wherein:
a third groove among the grooves is formed in a 'v' shape; and
a fourth hole among the holes is disposed in a first side of the third roove and a fifth hole among the holes is disposed in a second side of the third groove.

13. The motor of claim 6, wherein:
a bearing is further disposed in the cover body by an insert injection method; and
the bearing is disposed on an outer circumferential surface of the rotating shaft.

14. The motor of claim 6, wherein the stator includes:
a stator core,
wherein the coil is wound around the stator core; and
an insulator interposed between the stator core and the coil,
wherein the insulator includes a coil terminal which extends from an upper surface of the insulator in an axial direction, and the coil terminal, in which one region of the coil is disposed, is disposed to pass through the first hole.

15. The motor of claim 14, wherein the coil terminal is disposed to pass through and protrude from the first hole of the cover assembly.

16. The motor of claim 14, wherein the insulator includes:
a first insulator disposed on an upper portion of the stator core; and
a second insulator disposed on a lower portion of the stator core,
wherein the coil terminal is disposed on an upper portion of the first insulator.

17. The motor of claim 16, wherein the coil terminal includes:
a coil terminal body; and
a fourth groove formed in the coil terminal body,
wherein the coil is disposed in the fourth groove.

18. The motor of claim 6, further comprising a router disposed on the stator,
wherein the router includes a router body and a coil terminal which extends from an upper surface of the router body in an axial direction, and
the coil terminal is disposed to pass through an inside of the first hole formed in the cover assembly.

19. The motor of claim 18, wherein the coil terminal includes:
a coil terminal body; and
a fifth groove formed in the coil terminal body,
wherein the coil is disposed in the fifth groove.

20. The motor of claim 18, wherein:
a sixth groove and a seventh groove are further disposed in an upper surface of the router; and
a curvature of the sixth groove is different from that of the seventh groove.

* * * * *